March 12, 1946. G. H. CUMMINGS ET AL 2,396,300
REFINING OF MINERAL OILS
Filed Nov. 22, 1940
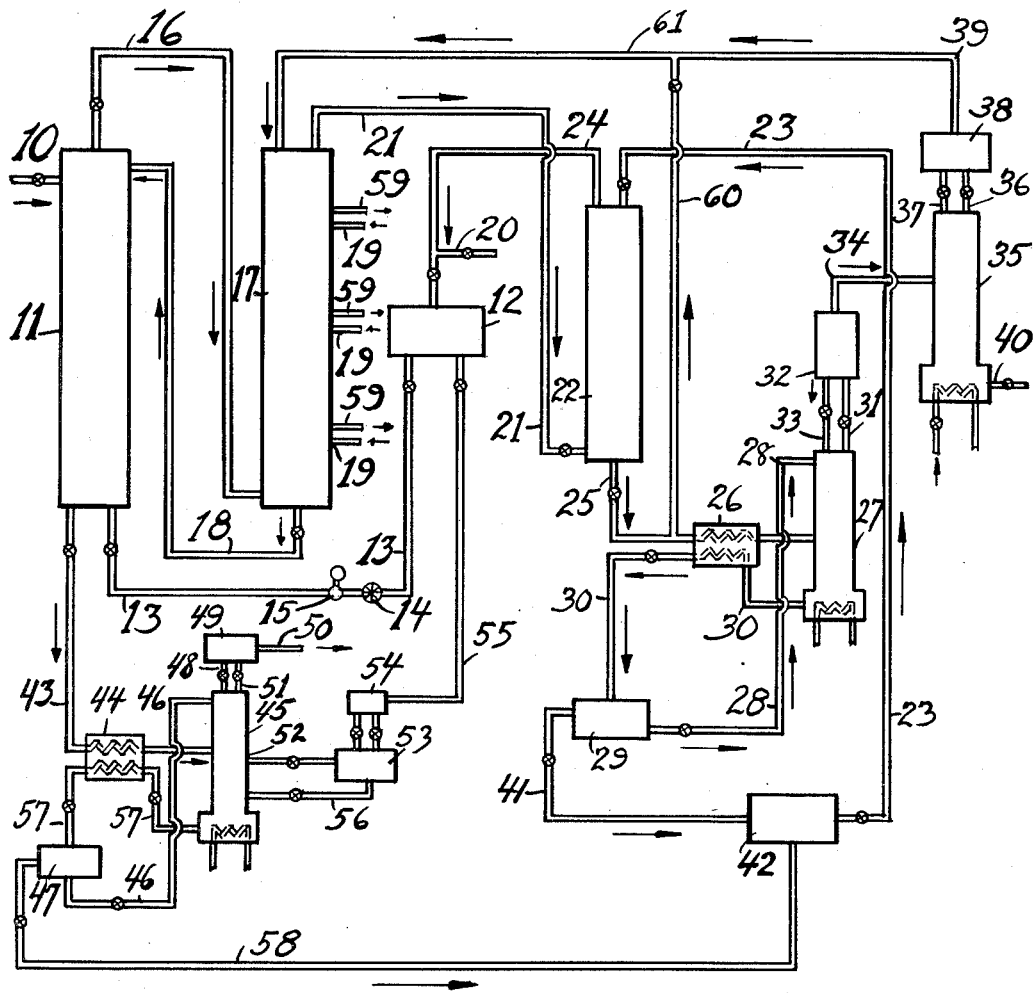
George H. Cummings
William J. Sweeney
Merrell R. Fenske Inventors
By C. L. Young Attorney Patented Mar. 12, 1946

2,396,300

UNITED STATES PATENT OFFICE 2,396,300

REFINING OF MINERAL OILS

George H. Cummings, State College, Pa., William J. Sweeney, Elizabeth, N. J., and Merrell R. Fenske, State College, Pa., assignors of one-half to Standard Oil Development Company, a corporation of Delaware, and one-half to Röhm & Haas Company, a corporation of Delaware Application November 22, 1940, Serial No. 366,738

26 Claims. (Cl. 260—680)

The present invention relates to the refining of mineral oils and is more particularly concerned with the separation and recovery of diolefins from feed mixtures containing the same. In accordance with the present process, mineral oils, particularly petroleum hydrocarbon liquids obtained from any source, are treated under specific conditions in a manner to segregate the diolefins, utilizing a particularly desirable solvent which comprises ammonia and a substance which is characterized by having the ability to decrease the solvent power of the ammonia within definite critical limits. This application contains subject matter in common with and is a continuation-in-part of our copending application Serial No. 353,442, filed August 21, 1940.

It is known in the art that mineral oils such as petroleum oils contain various types of hydrocarbon constituents which may be generally classified as having paraffinic, aromatic, hydroaromatic or naphthenic, and unsaturated structures which vary over wide ranges in molecular weights. It is also known in the art to segregate these oils, particularly petroleum oils, into relatively more paraffinic or relatively hydrogen-rich fractions and into relatively more aromatic or relatively hydrogen-poor fractions by means of various selective solvents or solvent mixtures. The separation of the more viscous oils is usually accomplished by means of an organic solvent selected from the class of solvents which have a preferential selectivity for the relatively more aromatic type compounds as compared to the relatively more paraffinic type compounds. Solvents of this class are, for example, phenol, furfural, cresols, nitrobenzene, aniline, beta beta' dichlorodiethyl ether, and the like. When employing these solvents for any given molecular weight it generally follows that in a given solvent or solvent mixture the paraffinic type hydrocarbons are the least soluble, the naphthenes next, and the aromatic and unsaturated hydrocarbons the most soluble. Solvents of this class are employed together as well as in combination with other substances, as for example, with materials of the class of liquefied normally gaseous hydrocarbons such as ethane, propane, butane and the like.

The solvent or solvent mixture and the oil are contacted by various means, as, for example, by a batch or by multi-batch processes. However, in general, the conventional procedure is to contact the solvent and the oil in a countercurrent tower treating operation. In this type of operation the lighter phase, usually the oil, is introduced at the middle or bottom section of the tower, while the heavier phase, usually the solvent, is introduced at the upper part of the tower. The respective phases flow countercurrently under conditions adapted to secure optimum contact between the solvent and the oil. Contact between the countercurrently flowing phases is usually secured by suitable distributing and contacting means, as, for example, packed masses, pierced plates, distributing trays, and the like. Temperature and pressure conditions on the tower are adjusted to secure the formation of a solvent-poor or raffinate phase, the oil of which is relatively highly paraffinic in nature, and a solvent-rich or solvent extract phase, the oil of which is relatively highly aromatic in character. The respective phases are separated and handled in a manner to remove the solvent from the extract and the raffinate. This is usually accomplished by a distillation process, providing a sufficient differential exists between the boiling points of the solvent and the oil. Other means are also employed, as, for example, re-extraction with a secondary solvent or by washing with water and the like.

These organic solvents and extraction processes, while entirely satisfactory for securing a separation between the relatively more aromatic constituents and the relatively more paraffinic constituents of an oil such as in an operation for the production of a high quality paraffinic type lubricating oil from a petroleum oil fraction, are not particularly desirable for effecting the separation of a particular constituent from mixtures containing other constituents of a similar chemical structure. This is particularly true in the separation of diolefins from olefins.

In order to segregate particularly desirable diolefin constituents from feed oils containing the same, other substances than conventional organic solvents and processes have been proposed. These processes are concerned with operations for effecting a more efficient and economical separation of feed mixtures into their respective constituents according to molecular weight and chemical structure. Certain solvents proposed have been various inorganic and mineral acids in conjunction with their salts of copper and silver. Particular solvents which have been suggested for securing these results are liquefied normally gaseous inorganic solvents of the character of sulfur dioxide and liquid anhydrous ammonia. However, we have found that these solvents are not entirely satisfactory. Sulfur dioxide has been found to form troublesome solid sulfones with diolefins. Even if this chemical reaction is suppressed, sulfur dioxide cannot be employed to produce pure diolefins due to its great solvent power for olefins, even at very low temperatures. For example, sulfur dioxide is completely miscible with the amylenes at −100° F. Hence, these could never be separated from isoprene by this solvent. Diolefins polymerize very readily in the presence of sulfuric acid. Likewise, we have found that liquid anhydrous ammonia as such is not applicable to a variety of hydrocarbon separations such as is desirable in treating petroleum and mineral oils for the segregation of diolefins. This is due largely to its very limited range of solvent power. We have, however, discovered that unexpected desirable results are obtained and that diolefin constituents may be readily and efficiently segregated from feed oils containing the same, provided liquid ammonia be utilized in conjunction with a substance which is characterized by having the ability to decrease the solvent power of the ammonia within definite critical limits.

In order to secure a clear concept and value of a particular solvent a selectivity factor, termed beta, is employed. This factor is quite analogous to the alpha factor employed in distillation and may be represented by the following formula:

$$\text{Beta} = \left(\frac{Y_A}{Y_B}\right)\left(\frac{X_B}{X_A}\right)$$

in which the terms X and Y are used to denote concentrations in the raffinate and extract or solvent phases, respectively, while A and B denote, respectively, the more soluble and less soluble components or portions of the material being extracted. Through the concept of beta the limiting conditions for any separation can be determined as described by Varteressian and Fenske in Ind. Eng. Chem. 29, 270 (1937). Thus, $Y_A/Y_B$ equals the ratio of the more soluble component to the less soluble component in the solvent or extract phase, and $X_A/X_B$ equals the ratio of the more soluble component to the less soluble component in the oil or raffinate phase. Beta is a numerical measure of the solvent's selectivity or the solvent's ability to preferentially dissolve one particular type of constituent to the exclusion of other types of constituents.

It is known that the beta or selectivity of any particular organic solvent may be affected by the addition of other materials to the solvent. Generally as the solvent power of any solvent is increased the selectivity or beta decreases to a marked extent. This is particularly the case when employing liquid sulfur dioxide which is of a character similar to the character of liquid ammonia. Liquid sulfur dioxide even with the use of modifying agents is also subject to other limitations in the purity of extract obtainable, even at very low temperatures.

Organic solvents which have been found satisfactory for lubricating oil extraction and high molecular weight separations, such as phenol, beta beta' dichlorodiethyl ether, furfural, cresylic acid, etc., are unsuitable for the treatment of lighter hydrocarbons, i. e., hydrocarbon fractions boiling below a typical light lubricating oil. It is known that various substances are added to the foregoing and other solvents to obtain more or less improved operation in treating oils and particularly relatively high molecular weight hydrocarbons. In many cases such other substances are added to alter density relationships, thereby facilitating phase separation. They are also added to reduce emulsions. Their effect on the solvent power or selectivity of the particular solvent to which they are added is obscure since the function and choice of such materials depends on their ability to disengage the solvent and oil more rapidly than would otherwise be possible. The selection of such substances also depends on the properties of the solvent and the oil being treated.

In some cases other liquids have been added to a particular solvent in order to alter its solvent power. The effectiveness of these added liquids depends largely on the properties and characteristics of the primary solvent to which they are added. For most of the primary solvents in present use very few modifying solvents may be extensively used due to difficulties experienced with density factors, emulsions, mutual solubility, chemical interaction, corrosion, etc. Some of the combinations in use are accompanied by unforeseen difficulties. For example, when benzol is added to liquid sulfur dioxide to adjust the solvent power of the solvent, the selectivity as measured by beta drops considerably and to an almost prohibitive extent. Adding water to phenol reduces its solvent power for oil. Furthermore the phenol-water mixtures are considerably more corrosive than either phenol or water alone. In some cases there are also emulsion troubles. Very few liquids may be added to furfural and Chlorex due to their relatively great chemical reactivity. It is known that few, if any, liquids soluble in liquid sulfur dioxide will reduce its solvent power without chemical reaction or causing the corrosion of equipment. No wholly satisfactory solvent has yet been found for changing the dissolving power of liquid sulfur dioxide without impairment of its selectivity due to the properties of sulfur dioxide. In general, while the principle of modifying solvents for altering solvent power is relatively well understood, their applicability has been greatly restricted due to the disadvantages which their use incurs. These disadvantages include: loss of selectivity, increase in corrosiveness, the production of emulsions, difficulty in separating the modifying solvent from the primary solvent, difficulty in separating the primary solvent or modifying solvent from the hydrocarbon mixture being treated, and incompatibility of the modifying solvent with the primary solvent over a relatively wide range of concentration or hydrocarbon solubility. This is a particular obstacle if more than two products are to be obtained from any solvent treating operation. However, a principal disadvantage of employing a modifying agent to alter the solvent power of a particular solvent is that a loss in the selectivity of the solvent occurs as measured by a lower beta.

Liquid anhydrous ammonia has been proposed for certain specific separations of hydrocarbons particularly in the low molecular weight hydrocarbon range. However, in general, this solvent is not suitable for segregating the various constituents of mineral and petroleum oils due to its limited and irregular solubility characteristics as shown in the following paragraphs.

The solubilities of various hydrocarbons in liquid anhydrous ammonia are as follows:

Table I

[Temperature=110° F. Solvent=Liquid anhydrous ammonia]

| Hydrocarbon | Weight per cent solubility in ammonia |
|---|---|
| n-Pentane | 21.2 |
| n-Hexane | 15.2 |
| n-Heptane | 10.0 |
| n-Octane | 6.1 |
| n-Nonane | 4.0 |
| n-Decane | 2.9 |
| n-Hexadecane | 0.2 |
| Cyclohexane | 14.5 |
| Methylcyclohexane | 13.3 |
| 2,2,4-trimethylpentane | 10.1 |
| Diisobutylene | 29.5 |
| Toluene | 14.3 at −16° F. |
| Dipentene | 29.0 |

The respective miscibility temperatures using equal volumes of various liquid hydrocarbons and liquid anhydrous ammonia are as follows:

Table II

| Hydrocarbon | Miscibility temperature |
|---|---|
| | °F. |
| Propane | 83 |
| Propylene | 22 |
| Butadiene | −22 |
| Butene-1 | 41 |
| Isobutene | 43 |
| n-Butane | 106 |
| Isoprene | 18 |
| Trimethylethylene | 73 |
| Pentene-2 | 76 |
| Mixed amylenes | 74 |
| Toluene | 19 |
| Dipentene | 125 |

The above two tables clearly demonstrate that liquid anhydrous ammonia is not a satisfactory solvent for the segregation of petroleum hydrocarbon constituents particularly from fractions or feed stocks that are diolefinic or olefinic in character due to the wide range of temperatures necessary to obtain a practical solubility of hydrocarbons in the liquid ammonia. Furthermore, temperature adjustments alone are not satisfactory expedients for applying this solvent to a variety of hydrocarbon mixtures. When treating some stocks, the low temperature required to form two phases with liquid anhydrous ammonia and one of the components may be near or below the freezing point of this component, or below its flow point should its viscosity become too great. For example, it is impossible to form two liquid phases with liquid anhydrous ammonia and benzene or naphthalene due to the separation of a solid phase. These hydrocarbons are apt to be present in diolefinic fractions. In other cases the low temperatures required may be uneconomical to produce. In the separation of butadiene from other four-carbon atom hydrocarbons it is necessary to use temperatures below about −25° F. On the other hand, in the case of the required temperatures being high, such temperatures markedly reduce the selectivity, or beta, of ammonia, for in general the higher the temperature the smaller the value of beta. The relatively low critical temperature of liquid ammonia further limits the degree to which solvent power may be raised by an increase in temperature in order to afford proper solubility for the higher molecular weight diolefinic fractions. Also high temperature values are undesirable. In many instances they make the process uneconomical by requiring unnecessarily high pressures. In extracting hydrocarbon fractions boiling around 200° C. with anhydrous ammonia the pressures would approach or exceed 600 pounds per square inch. In certain cases when reactive compounds such as diolefins are concerned, the increased temperature in many instances causes undesirable chemical reactions to occur. In addition to a loss in yield, many such compounds so formed precipitate out when the temperature is reduced later on in the process. Such precipitation causes operating difficulties and interferes with the continuity of the extraction operation. As another example, in the extraction of light oils, such as oils containing naphthenic acids, temperatures above 125° C. must in general be used to obtain appreciable solubility of hydrocarbon components in the ammonia. It is well-known that above 80° C. the naphthenic acids tend to form amides with the ammonia and since these cannot be regenerated by heat, this results in a loss in solvent. A relatively large temperature change is also impractical since a reversal of phase density often occurs. That is, at one temperature the solvent phase is heavier than the hydrocarbon phase, whereas at another temperature the reverse is the case.

In separating relatively pure diolefins from feed mixtures containing them it is usually necessary to have both stripping and enriching sections in the extraction apparatus. Furthermore, to make such separations practical and economical on a relatively large scale, it is necessary to have the solubility of dissolved hydrocarbons reasonably constant throughout most of the extraction apparatus. Otherwise, excessive solvent-to-oil ratios or extraction stages are needed. Liquid anhydrous ammonia as such fails to meet most of these solubility requirements, because the temperatures needed to afford proper control of the solubility in the stripping and enriching sections are too divergent. Reference to Tables I and II clarifies this point. For example, in the separation of, say, isoprene from pentane, it is desirable that the solubility of dissolved hydrocarbons in the ammonia be within the range of 10 to 20 per cent. To accomplish this, one end of the extraction apparatus would have to be at about 100° F., while the other end was at about 0° F. Such a temperature range is undesirable and uneconomical as already discussed.

It is thus apparent that ammonia is not a satisfactory solvent and cannot be used commercially for a majority of the desired separations due to the fact that the yields are relatively low, that the solubilities are too restricted and limited, and that it is extremely difficult, if not impossible, to treat various petroleum fractions containing aromatics such as benzene, toluene, and naphthalene along with diolefins so as to prepare the latter in a satisfactory pure state. Furthermore, with liquid ammonia it is frequently impractical or impossible to make a pure extract due to the miscibility temperatures for such materials being so low that the required temperatures are prohibitive or that the extractable component may not exist in the liquid state at such temperature.

Furthermore, from the knowledge of prior art it is not to be expected that these inherent disadvantages possessed by liquid anhydrous ammonia could be rectified by methods known to the art. As previously pointed out modifying agents employed in conjunction with organic solvents materially affect the selectivity or beta of the solvent. This adverse effect on the selectivity of the solvent seems to be materially aggravated when employing a solvent selected from the class of liquefied normally gaseous inorganic solvents. For example, benzene when employed in conjunction with sulfur dioxide reduces the selectivity of the sulfur dioxide to a small fraction of its former value. This greatly impairs or prohibits its use in many cases where it would otherwise be very applicable. In fact, no inorganic selective solvent has been proposed to which modifying solvents may be added without critically impairing the selectivity of the solvent.

We have, however, discovered that, providing the solvent comprises ammonia and a modifying agent, which is characterized by having the ability to decrease the solvent power of the ammonia, unexpected desirable results are secured. We have discovered that providing the characteristics of ammonia be modified as described with the desired modifying agent it is possible to treat feed oils for the segregation of diolefin constituents and secure results which otherwise could not be secured, either by the use of ammonia alone or by means of closely related solvents. We have discovered that ammonia is compatible with a variety of substances capable of varying its solvent power for diolefin constituents, that when these modifying solvents for adjusting solvent power over a definite range are used, little, if any, loss in selectivity occurs, and that there is substantially no increase in corrosiveness or in emulsions.

Suitable modifying solvents or substances can be chosen from a relatively large group. Any substance which will not react, but which when added to the system will decrease the solvent power of the liquid ammonia may be used. Suitable substances are, for example, water, ethylene glycol, formamide, and ethylene diamine. It is not necessary that the modifying solvent be completely soluble in the liquid ammonia. A highly-refined paraffinic or relatively saturated oil may also be utilized to lower the solubility of the ammonia solvent.

A highly refined or paraffinic-like oil is quite effective. As an example, the solubility of a mixture containing 75 per cent butadiene and 25 per cent isobutylene is 12 per cent when 1 part of the mixture is extracted with 4 parts of liquid anhydrous ammonia at −45° F. This same solubility and selectivity was obtained by adding 2.6 parts of a highly paraffinic oil to the system and extracting at +32° F., or at a 77° F. higher temperature. The use of such oils is particularly desirable when extracting low molecular weight hydrocarbons, i. e., those below 100, and especially when employing countercurrent extraction wherein the solubility is adjusted at several points in the extraction path by the addition of such oils. Low molecular weight paraffinic hydrocarbons such as propane are suitable modifying solvents. Toluene is also effective. In general, we have found that the lower the molecular weight, the more effective this type of modifying solvent becomes so long as its solubility in the ammonia is relatively low. Thus the low molecular weight relatively saturated naphthenic and paraffinic hydrocarbons such as cetane, decane, and decalin are particularly effective. It should also be understood that substances which are oxygenated, halogenated, or nitrogeneous are also suitable provided that a relatively large part of such material contains a relatively saturated hydrocarbon radical. When the dissolving power of ammonia solvents is so adjusted by using incompletely miscible modifying solvents, the selectivity as measured by beta is not substantially affected. Thus, many separations are now possible that heretofore were impossible.

By the use of these various modifying solvents in various amounts, it is possible to obtain any degree of solvent power for the diolefin constituents. However, we have found that it is preferable to confine this solubility to relatively definite limits, particularly at the feed point in the countercurrent extraction apparatus. We prefer that the conditions of extractions be so adjusted, that, at the hydrocarbon feed point, the solubility of the diolefin constituents in the solvent lie in the range from 5 to 30 per cent. We have found that the selectivity, or beta, for ammonia together with a modifying solvent is closely dependent upon this diolefin solubility in the solvent. Beta and the solubility control the number of stages required and the solvent-to-oil ratio needed.

The amount of modifying solvent added depends upon the degree to which the solvent power should be changed, and hence upon the mixture being extracted and the particular modifying solvent used. Water is very potent in changing the solvent power and in general should not be used in concentrations above 25 per cent. Ethylene glycol is most satisfactory in concentrations below 40 per cent. The ammonia and the modifying solvent may partition themselves between the extract and raffinate phases in a different concentration ratio. As a result, when countercurrent treating operations are being employed, the composition of the solvent may change along the countercurrent path. In general, this composition change will have a beneficial effect, for the solvent usually decreases in solvent power because of this change as it flows through the countercurrent extraction path. This effect aids in maintaining the solubility at a more constant value, and leads to more efficient extraction.

Modifying solvents, particularly those completely soluble in the ammonia, may be added directly to the ammonia, or they may be added to a countercurrent treating system at several points. We have found the addition of the modifying solvent at one or more points in a countercurrent extraction path to be particularly effective. In this way the solubility is controlled so as always to be within the proper limits in order that the selectivity or beta may be high. It is frequently much more feasible and practical to control the solubility in this way than in other ways, for example, by changing the temperature.

The present process may be used in the treatment of any feed oil. It is particularly applicable in the treatment of low viscosity or non-viscous oils having molecular weights in the range of about 40 to about 400. In general, we have found it to be particularly adapted in the treatment of oils boiling in the range below the boiling range of light lubricating oil fractions and especially desirable in the segregation of relatively pure diolefin constituents with from 3 to 12 carbon atoms per molecule.

Operating temperatures and pressures may vary considerably. Under certain conditions the temperatures may be in the range from about 0 to 150° F. However, due to the particular nature of the solvent and the diolefin it is preferred that the temperatures be in the range from about −10 to +100° F. The pressures in general should be sufficient to maintain all the constituents in the liquid state and may be adjusted to regulate the solubility of the constituents in the solvent. In general, it is preferred that the pressures be in the range from about 15 to 200 pounds per square inch gauge.

The solvent-to-oil ratio will depend upon the mixture being treated and on the solubility in the solvent. As indicated, the solubility should be controlled so that the amount of oil dissolved is within a certain critical range, in order that the solvent be effective and in order that a practical commercial operation be secured. Effective and practical operation is considered to be a reasonably low solvent-to-oil ratio, for example, less than 10 to 1, a relatively low number of theoretical extraction stages required, for example, less than 25, ample control of solubility and phase separation together with the ability to produce any desired degree of purity and if necessary approaching 100 per cent purity for the extractable materials in a high yield. The feed rate will be a function to a large extent of the specific feed mixture and the solvent-to-oil ratio. In general, when applying about 10 to 1 solvent-to-oil ratio the feed rate should be in the range from about 20 to 40 gallons per hour per square foot of cross sectional area when separating diolefins.

In the segregation of substantially pure diolefins from olefins and paraffins by our process, it is frequently desirable to use two extraction zones: a stripping zone to remove the diolefins preferentially from the feed, and an enriching zone to purify the diolefins thus removed from the other components which are of necessity dissolved at the same time, but to a minor degree. In order to obtain a high recovery of diolefins it is necessary to dissolve them from the feed hydrocarbon. In view of the widely different solubility of olefins and paraffins and diolefins in the ammonia solvents, it is frequently desirable to use different concentrations or different modifying solvents in the two zones of extraction. A particularly desirable modification of our invention is to employ as solvents ammonia and a relatively saturated or paraffinic oil or ammonia, water, and a relatively saturated oil in which the concentration of the modifying solvents water and the oil is different in the two zones. In other instances it is desirable to employ in the stripping section ammonia together with solvents to increase the dissolving power, such as methylamine, in order to be able to remove completely the diolefins from the feed. In this case a solvent to reduce the dissolving capacity of the ammonia solvent is usually used at one or more points in the enriching section in order to purify the diolefins.

The solubility of the individual components in a given ammonia solvent is dependent not only upon the type of the component, but also upon its molecular weight. For a given type, the lower molecular weight compounds are in general more soluble. For example, we have found that butadiene is soluble in an ammonia solvent at 60° F. to the extent of eleven per cent. Isoprene dissolved in this same solvent at the same temperature to the extent of only six per cent. Propylene was soluble to the extent of five per cent; whereas less than one per cent of the amylenes were dissolved.

These properties of the ammonia solvents broaden their use in some instances, but restrict them in others. For example, these solvents may be used to prepare butadiene as a substantially-pure extract, while any polymerization products would be rejected in the raffinate. On the other hand, the feed oil must not be too broad in molecular weight, as otherwise the lighter olefins would have the same solubility as the heavier diolefins and would contaminate the extract. In extracting a cut containing from three to six carbon atom hydrocarbons, some propylene would be dissolved along with the six carbon atom diolefins. Hence, pure diolefins would not be obtained. In general, we prefer that the molecular weight range of the feed oil be within 15 to 30 units.

Due to this molecular weight effect on solubility in the ammonia solvents, the amount of modifying solvent required will be a function of the compositions of the feed oil. Our procedure for carrying out extraction has been to choose a desirable temperature, then determine the amount of modifying solvent required to reduce the solubility of the pure extractable components in the solvent to about twenty-five per cent. We then used slightly less than this amount of modifying solvent in the stripping section, but added modifying solvent up to this amount in the enriching section. When this procedure was carried out, we discovered that diolefins could be effectively and completely freed of olefins and paraffins of a similar molecular weight range.

In order to further illustrate the invention the following examples are given which should not be construed as limiting the same in any manner whatsoever.

EXAMPLE 1

A feed mixture consisting of 25 per cent butadiene in four-carbon atom olefins and paraffins was extracted at 50° F. with 15 parts of a solvent composed of 88 per cent ammonia and twelve per cent water. When the feed was introduced at approximately the mid-point and reflux was returned to the system, twenty-five per cent of the feed was obtained as extract of 98% butadiene, while the remainder was obtained as raffinate containing only two per cent butadiene. Liquid anhydrous ammonia under these same conditions would not give two phases with the feed, hence no separation was possible.

EXAMPLE 2

The feed mixture from Example 1 was extracted at +32° F. with a solvent composed of 10 parts of ammonia and 6 parts of a highly paraffinic oil, with the added oil flowing throughout the entire extraction path. Under these conditions the butadiene was extracted in a purity of 98 per cent while only two per cent remained in the raffinate. Under these same conditions liquid anhydrous ammonia yielded a maximum purity of butadiene of 60 per cent. When the extraction was carried out in the same column at −30° F. with liquid anhydrous ammonia in the same solvent-to-oil ratio, the purity of butadiene was only 85 per cent. It is apparent that the use of our modified ammonia solvents have permitted the extraction of more pure butadiene at more economical temperatures.

EXAMPLE 3

Isoprene was produced in a purity of 95 per cent and in a yield of 96 per cent from a feed mixture consisting of 30 per cent isoprene in five-carbon atom olefins and paraffins. The extraction was carried out at 75° F. with a solvent composed of 35 per cent ethylene glycol in ammonia. Under these conditions, no separation of isoprene from the olefins was possible with liquid anhydrous ammonia.

EXAMPLE 4

Cyclopentadiene was separated from olefins and paraffins of a similar boiling point in a purity of 95 per cent. Ammonia-water and a highly paraffinic oil was employed as the modified ammonia solvent and the extraction was carried out at 80° F.

The present invention may be widely varied. The concentration of the modifying solvent will depend upon the particular modifying solvent employed and upon the character of the feed oil. For example, we have found that when the solvent comprises ammonia, water and monomethylamine, the final solvent composition should be approximately as shown by the following examples when at normal temperatures it is desired to remove in the solvent extract the constituents of the feed above the solid line. The number of carbon atoms in the molecule is designated by the subnumerals.

type hydrocarbons having molecular weights within the range of 160 to 300.

It should be emphasized that an aromatic hydrocarbon of approximately the same molecular weight as a diolefin is more soluble in our ammonia solvents than the diolefin. Consequently, if diolefins are to be the principal or main extract obtained by our extraction process, the feed mixture is preferably aromatic-free. Further, for obtaining diolefins of maximum purity directly from our extraction process, we prefer to extract mixtures wherein the molecular weight range is of the order of 15 to 30 units in molecular weight. If aromatics are present along with diolefins in the feed mixture, our process is particularly applicable to segregating both these hydrocarbon classes, for, according to our invention, the solubility of each class in our ammonia solvent may be maintained at values to make such an operation very practical. For example, if a hydrocarbon mixture of 100 to 130 molecular weight range containing both aromatics and diolefins is

Feed analysis

| | Feed | | | | | | | | | | | | | | |
|---|---|---|---|---|---|---|---|---|---|---|---|---|---|---|---|
| | I | II | III | IV | V | VI | VII | VIII | IX | X | XI | XII | XIII | XIV | XV |
| Aromatics | $C_{11}$ | $C_{11}$ | $C_{11}$ | | | | $C_8$ | $C_8$ | $C_8$ | | | | | | |
| Diolefins | $C_{10}$ | $C_{10}$ | $C_{10}$ | $C_{10}$ | $C_{10}$ | | $C_7$ | $C_7$ | $C_7$ | $C_7$ | $C_7$ | | $C_4$ | $C_4$ | |
| Olefins | $C_{12}$ | $C_{12}$ | $C_{12}$ | $C_{12}$ | $C_{12}$ | $C_{12}$ | $C_6$ | $C_6$ | $C_6$ | $C_6$ | $C_6$ | $C_6$ | $C_5$ | $C_5$ | $C_5$ |
| Naphthenes | $C_{11}$ | $C_{11}$ | $C_{11}$ | $C_{11}$ | $C_{11}$ | $C_{11}$ | $C_7$ | $C_7$ | $C_7$ | $C_7$ | $C_7$ | $C_7$ | $C_4$ | $C_4$ | $C_4$ |
| Paraffins | $C_{12}$ | $C_{12}$ | $C_{12}$ | $C_{12}$ | $C_{12}$ | $C_{12}$ | $C_9$ | $C_9$ | $C_9$ | $C_9$ | $C_9$ | $C_9$ | $C_5$ | $C_5$ | $C_5$ |
| $NH_3$ | 85 | 75 | 60 | 75 | 60 | 60 | 95 | 85 | 75 | 85 | 75 | 75 | 85 | 92 | 92 |
| $H_2O$ | 5 | 5 | 5 | 5 | 5 | 5 | 5 | 5 | 5 | 5 | 5 | 5 | 15 | 8 | 8 |
| Methyl amine | 10 | 20 | 35 | 20 | 35 | 35 | | 10 | 20 | 10 | 20 | 20 | | | |

Dipentene or closely related compounds are also separable from hydrocarbon mixtures containing the same boiling within the range 160–200° C. If the feed mixture contains, say, 20 to 30 per cent or less of dipentene the extraction of the feed may be carried out at ordinary temperatures with an ammonia solvent containing ammonia and 10 to 25 per cent methyl amine. In mixtures containing dipentene in excess of 70 per cent it is advisable to decrease the solvent power of the ammonia solvent below that used for extracting relatively lean dipentene mixtures. This may readily be accomplished by adding water, ethylene glycol, or a paraffinic-type mineral oil to the ammonia solvent, which, for example, may be ammonia containing methylamine as above mentioned. In this instance the ammonia is modified, for example, by using methylamine, so its solvent power is increased for treating relatively lean diolefin mixtures, and then by the addition of water, glycol, or paraffinic-type oil this ammonia solvent is reduced in solvent power so that the solubility for diolefin rich mixtures may be held at 10 to 25 per cent without the use of excessively low or high temperatures. The extraction of diolefins from hydrocarbon mixtures having molecular weights in the range of 70 to 150 is quite similar to that used for segregating dipentene. Instead of methylamine other low molecular weight aliphatic amines are applicable. In general, the concentration of such substances in the ammonia solvent will not exceed 35 per cent, and such solvent mixtures are particularly usable in the stripping section of the extraction apparatus. In the enriching section it is usually necessary to reduce the dissolving power of the solvent present in the stripping section by the addition of water, glycol, formamide, or paraffinicto be treated, we prefer to segregate the aromatics at the end of the enriching section, using an ammonia solvent of reduced dissolving power, while at the end of the stripping section a raffinate reasonably free of both aromatics and diolefins is withdrawn, having been extracted with an ammonia solvent of enhanced dissolving power. At some point between the above-mentioned extract and raffinate ends of the extraction system, the diolefins will be concentrated; they will also contain some aromatics but will be relatively free of raffinate hydrocarbons. We prefer to withdraw this mixture and to simultaneously extract it to produce a raffinate containing principally diolefins with an ammonia solvent having a higher dissolving capacity than that used in the enriching section wherein the aromatics are being segregated, and then return this solvent to main extraction apparatus at a point near the withdrawal point of the diolefin-rich hydrocarbon layer. This type of extraction operation is known as side-stream processing. It is particularly usable in connection with our process wherein the solvent power of the ammonia is adjusted and controlled to permit the segregation of hydrocarbons having widely different solubilities in pure ammonia.

In all these extractions we found that the polymerization products of the diolefins were rejected in the raffinate, while the pure diolefins, stabilized in the basic solvent, were obtained as an extract.

From the foregoing examples, which are given only by way of illustration, it is apparent that we have discovered a solvent system which is capable of separating diolefins from the corresponding olefins and paraffins of a similar boiling point in a greater purity, a greater yield and more economically than was heretofore possible.

A particularly desirable method of operating in accordance with our process may be seen by reference to the attached drawing illustrating one modification of the same. Again for the purpose of illustration it is assumed the feed consists of 25 per cent butadiene in butylenes and the solvent comprises ammonia-water and a highly paraffinic oil.

The hydrocarbon feed mixture is introduced by means of line 10 into extraction zone 11. The feed is introduced into the top of zone 11 although an intermediate feed point may be used. Extraction zone 11 may comprise any suitable countercurrent phase contacting devices such as a series of mixers and settlers, a packed tower, etc. These phase contacting paths may be equipped with heating and cooling devices so that the temperature may be controlled at any desired level or so that a temperature gradient may be employed. For the purpose of illustration it is assumed that the temperature is controlled at about 50° F. The solvent, ammonia containing about six per cent water, is passed from storage tank 12 by means of line 13, valve 14 and pump 15 and introduced into the bottom of zone 11. A solvent-to-oil ratio of about ten-to-one is employed.

The extract phase, consisting of the solvent and substantially all the butadiene and some of the butylenes, is removed from zone 11 by means of line 16 and introduced near the bottom of extraction tower 17. The raffinate phase is removed from the bottom of this tower and introduced into the top of zone 11 by means of line 18. It is preferred to use a temperature gradient in tower 17 of from about 50° F. at the bottom to about 32° F. at the top. Instead of a temperature gradient it may be desirable to inject water at points 19 in order to bring the solubility into the desired range. If this operation be employed, the solvent returning to storage tank 12 would have to be by-passed by means of line 20 and treated in any desirable manner to remove the injected water.

The extract phase, consisting of solvent and substantially pure butadiene is removed from tower 17 by means of line 21 and sent to the bottom of solvent recovery tower 22. This tower is similar in construction to towers 11 and 17, and is operated at a constant temperature of about 32° F. Here the extract phase is contacted with substantially an equal proportion of a highly paraffinic oil which is introduced into the top by means of line 23. The added oil removes completely the dissolved hydrocarbons from the solvent. The pure solvent is then taken to storage tank 12 by means of line 24. The added oil containing all the hydrocarbons and some ammonia is removed from the bottom of tower 22 by means of line 25, and is passed through heat exchanger 26 to distillation column 27. Heat is supplied to the bottom of this column which vaporizes the ammonia and hydrocarbon and boils the water which steam strips the paraffinic oil. Water is introduced from settler 29 by means of line 28. Vapors from the top of column 27 are removed by means of line 31 and passed to partial condenser 32. This condenser is run at such a temperature that all the water is returned as reflux to tower 27 by means of line 33. The hydrocarbons together with the ammonia are removed overhead by means of line 34 and passed to distillation tower 35. Additional heat is supplied to the bottom of this tower. The product from the bottom of the tower is substantially pure butadiene which is removed by means of line 40. The excess hydrocarbons together with all the ammonia are passed to condenser 38 by means of line 36 where they are totally condensed. Part is returned by means of line 37 as reflux. The remainder is passed by means of lines 39 and 61 to the top of extraction tower 17 where it is returned as reflux. The residue from the bottom of distillation column 27, consisting of the highly paraffinic oil and water is removed by means of line 30 passed through heat exchanger 26 to settler 29. The water layer is returned to the column by means of line 28 while the oil is returned by means of line 41 to storage tank 42. From here it is taken to solvent recovery tower 22 by means of line 23. Part of the oil containing hydrocarbons and some ammonia which is removed from the bottom of this tower is taken by means of lines 60 and 61 to the top of extraction tower 17 where it serves as a modifying solvent for the ammonia.

The raffinate from the bottom of extraction zone 11 consists of substantially pure butylenes together with a little ammonia and the oil which was not previously removed. It is taken by means of line 43 through heat exchanger 44 to distillation column 45. This column is similar in construction to tower 27. Heat is supplied to the bottom of this tower which vaporizes all the hydrocarbons and ammonia and boils the water in the still which steam strips the oil. Water is introduced into this tower from settler 47 by means of line 46. The water serves the purpose of returning any ammonia so that pure butylene vapors are taken by means of line 48 to condenser 49. The pure hydrocarbon product, butylene is removed by means of line 50. Some of the condensed vapors are returned by means of line 51 as reflux, together with water which may have distilled. A liquid phase is withdrawn from a point 52 in tower 45 so that when it is distilled in still 53, substantially pure ammonia is obtained. This is condensed in condenser 54 and returned to storage tank 12 by means of line 55. If desired, part of the condensate may be returned to 53 as reflux. The residue from 53 is returned to 45 by means of line 56. All the ammonia is removed in this way.

The residue from column 45 consisting of the oil and water is removed by means of line 57 passed through heat exchanger 44 to settler 47. The water layer is returned to tower 45 by means of line 46. The oil is returned to storage by means of line 58.

One method of controlling the solubility in tower 17, other than to maintain a temperature gradient and by means of water injections, is to control the amount of highly paraffinic oil in the raffinate phase. A part of the raffinate phase may be removed at one or more points 59 along the extraction path, and stripped of the components being extracted which are then returned to the tower at points 19. The oil is returned to storage tank 42. By control of the amount of oil removed at these points, excellent adjustment of the solubility results.

When extracting feed mixtures containing 25 per cent butadiene in a manner outlined above, extract and raffinate products containing 98 per cent and two per cent respectively of butadiene are obtained.

Ammonia is the only liquid normally gaseous inorganic solvent known which is capable of being modified with a modifying agent for securing separation of diolefin constituents herein outlined. It is, furthermore, the only solvent which may be readily separated from the feed oil and which may be also readily separated from the modifying agent. Ammonia is an inorganic solvent which together with a satisfactory modifying agent as disclosed in the present application will efficiently and economically separate these complex diolefin constituents from hydrocarbon oils. As herein modified it is the only solvent of the character of, for example, sulfur dioxide and mineral acids which is wholly satisfactory for separations where these solvents have proven unsatisfactory. It possesses none of the disadvantages of sulfur dioxide or mineral acids.

The following definitions relate to the claims and the preceding specification.

By a predominate proportion of liquid ammonia we mean liquid ammonia together with a modifying solvent such that the ammonia contributes principally to the solvent's selectivity, as illustrated in the preceding examples.

Ammonia solvent means liquid ammonia together with a modifying solvent.

The term methylamine is used to denote mono-, di-, trimethylamine, or mixtures of these.

By a modifying solvent we mean any liquid which when added to the system will change the solvent power of the solvent. The modifying solvent may or may not be a selective solvent, its determining characteristic being only that it will change the dissolving capacity of the liquid ammonia.

The term zone denotes one or more extraction stages or the equivalent which are properly interconnected, as already demonstrated, wherein continuity of flow and control of operating variables are maintained. By a first zone we mean that portion of the extraction path between which the feed oil enters and the raffinate phase leaves the system. By a second zone we mean a path, including one or more extraction stages, along the line of solvent flow beyond the point of feed oil introduction.

Relatively high dissolving capacity means the ammonia solvent dissolves the extractable component or components to a considerable degree, if not completely, and such a solvent is capable of dissolving appreciably the raffinate portions or components. Relatively low dissolving capacity means the ammonia solvent is incompletely miscible with the extractable component or components, and the solubility of such materials in the solvent is usually 20 to 30 per cent or lower, while the raffinate portions or components are relatively insoluble, i. e., the solubility of such material is of the order of 3 to 10 per cent or less.

By mineral oil we mean mixtures that are predominantly hydrocarbons, such as exist in petroleum or its fractions, or predominantly hydrocarbon mixtures obtained by processing such fractions.

The present invention is not to be limited by any theory or mode of operation but only in and by the following claims in which it is desired to claim all novelty insofar as the prior art permits.

We claim:

1. A process for the segregation of a diolefin with a molecular weight less than about 250 from a mixture of a diolefin and more saturated hydrocarbons of similar boiling points which comprises extracting feed mixture with a solvent consisting of liquid ammonia and a minor proportion of a modifying solvent which reduces the dissolving capacity of the ammonia for said feed mixtures and is soluble in liquid ammonia, under conditions to form a raffinate phase and a solvent extract phase containing dissolved therein the diolefin, controlling the concentration of hydrocarbons in the solvent extract phase between the limits of 5 to 30 weight per cent by the amount of said modifying solvent present in the ammonia, separating the solvent extract phase and recovering the dissolved diolefin therefrom.

2. A process as defined by claim 1 in which the modifying solvent is water.

3. A process as defined by claim 1 in which the modifying solvent is selected from the class of low molecular weight diamines.

4. A process as defined by claim 1 in which the modifying solvent is selected from the class of low molecular weight glycols.

5. A process as defined by claim 1 in which a hydrocarbon selected from the class of hydrocarbons which are substantially more soluble in the raffinate than in the extract phase is added to the extraction system.

6. A process as defined by claim 1 in which the concentration of the modifying solvent in the ammonia is between about 5 and 30 weight per cent based on the ammonia.

7. A process for the segregation and recovery of diolefin constituents with molecular weights less than about 250 from relatively narrow boiling hydrocarbon mixtures containing the same together with more saturated constituents, which comprises extracting the feed mixtures with a solvent consisting of liquid ammonia, a modifying solvent soluble in liquid ammonia to reduce its solvent power for said diolefins and a minor molecular proportion of a relatively saturated mineral oil with a boiling range different from that of the feed mixture, under conditions to form a raffinate phase and a solvent extract phase containing dissolved therein the diolefin constituents, controlling the concentration of hydrocarbons in the solvent extract phase between the limits of 5 to 30 weight per cent by the amount of said modifying solvents present in the extraction system, separating the solvent extract phase containing the dissolved diolefins and recovering the diolefins therefrom.

8. A process as defined by claim 7 in which the solvent comprises aqueous ammonia and a minor proportion of a relatively saturated mineral oil with a boiling range different from that of the feed mixture.

9. A process as defined by claim 7 in which the solvent comprises liquid ammonia, 5 to 15 weight per cent of water based upon the ammonia, and a relatively saturated mineral oil with a boiling range different from that of the feed mixture.

10. A process as defined by claim 7 in which the said hydrocarbon feed mixture comprises butadiene and mono-olefinic hydrocarbon constituents of approximately the same boiling range, and in which said extraction is conducted at temperatures in the range from about $-10°$ to $+80°$ F.

11. A process for the segregation and recovery of diolefin constituents containing from 3 to 6 carbon atoms in the molecule from liquid hydrocarbon feed mixtures containing the same together with more saturated constituents, which comprises contacting the feed mixture with liquid ammonia containing from 5 to 30 weight per cent based on the ammonia of a liquid substance soluble in liquid ammonia which reduces the dissolving capacity of the ammonia for said diolefins, under conditions to form a raffinate phase and a solvent extract phase containing dissolved therein the diolefin constituents, controlling the concentration of hydrocarbons in the solvent extract phase between the limits of 5 to 30 weight per cent by the amount of said substance present in the ammonia, separating the solvent extract phase containing the dissolved diolefins and recovering the diolefins therefrom.

12. A process in accordance with claim 11 in which said substance is water.

13. A process in accordance with claim 11 in which said substance is ethylene glycol.

14. A process in accordance with claim 11 in which said solvent contacts the feed oil in the presence of methylamine.

15. A process for the segregation of diolefins with molecular weights less than about 250 from relatively narrow boiling hydrocarbon feed mixtures containing the same together with more saturated constituents, which comprises introducing the feed mixture at an intermediate point in a countercurrent treating path, introducing liquid ammonia containing a liquid modifying solvent which reduces the solvent power of the ammonia for said diolefins and is soluble in liquid ammonia into one end of the countercurrent treating path, countercurrently contacting the feed mixture and solvent under conditions to form a solvent extract phase and a raffinate phase, introducing additional modifying solvent to further reduce the dissolving capacity of the ammonia, at at least one point between the point where the feed mixture is introduced into said path and a point near the end of the path from which the solvent extract phase is withdrawn, controlling the concentration of hydrocarbons in the solvent extract phase between the limits of 5 to 30 weight per cent by the amount of said modifying solvent present in the ammonia, withdrawing the respective phases from the respective ends of the countercurrent treating path, and recovering the diolefins from the solvent extract phase.

16. A process as defined by claim 15 in which the modifying solvent is water.

17. A process as defined by claim 15 in which the modifying solvent is ethylene glycol.

18. A process in accordance with claim 15 in which the solvent having the ability to decrease the dissolving capacity of the ammonia is present in a concentration of about 5 to 30 weight per cent based on the ammonia.

19. A process in accordance with claim 15 in which from 5 to 30 weight per cent of methylamine, based on the ammonia, is present in the ammonia solvent used in the countercurrent treating path located between the point where the feed is introduced and the point where the raffinate phase is withdrawn.

20. A process for the segregation of diolefin constituents containing from 6 to 12 carbon atoms in the molecule from more saturated hydrocarbon constituents of a feed mixture which comprises extracting said feed mixture with liquid ammonia containing from 5 to 30 weight per cent based on the ammonia of methylamine, and to which is added in at least a part of the extraction path from 5 to 40 weight per cent based on the ammonia of a liquid substance soluble in liquid ammonia which reduces the solvent power for said diolefins and controlling the concentration of hydrocarbons in the solvent extract phase between the limits of 5 to 30 weight per cent by the amount of said substance present in the ammonia.

21. A process as defined by claim 15 in which the feed mixture contains substantial quantities of cyclic diolefins containing from 5 to 10 carbon atoms.

22. A process for the segregation of diolefins containing from 6 to 10 carbon atoms from feed mixtures containing the same together with more saturated constituents, which comprises introducing the feed mixture at an intermediate point in a countercurrent treating path, introducing liquid ammonia into the end of the countercurrent treating path adjacent the point where the raffinate phase is withdrawn, countercurrently contacting the feed mixture and solvent under conditions to form a solvent extract phase relatively rich in diolefins, and a raffinate phase relatively free of diolefins, introducing a liquid modifying solvent soluble in ammonia that reduces the dissolving capacity of said ammonia for diolefins at at least one point between the point where the feed mixture is introduced into said path and a point near the end of the path from which the solvent extract phase is withdrawn to control the amount of hydrocarbon dissolved in the solvent extract phase between the limits of 5 to 30 weight per cent, withdrawing the respective phases from the respective ends of the countercurrent treating path and removing the diolefins.

23. A process as defined by claim 22 in which the modifying solvent is water.

24. A process as defined by claim 22 in which from 5 to 30 weight per cent methylamine, based on the ammonia, is present in the ammonia solvent.

25. A process for the segregation of diolefins of average molecular weight less than about 250 from a relatively narrow boiling hydrocarbon feed mixture containing components some of which are more soluble and some of which are less soluble in the solvent than the diolefins, which comprises introducing the feed mixture at an intermediate point in a countercurrent treating path comprising a stripping and an enriching zone, introducing a solvent consisting of ammonia and a modifying solvent soluble in liquid ammonia which reduces the solvent power of said ammonia into the end of the countercurrent treating path adjacent the point of final raffinate phase withdrawal, countercurrently contacting the feed mixture and controlling by addition of modifying solvent the solvent power of the ammonia solvent so that the concentration of hydrocarbon dissolved in the solvent is between the limits of 5 to 30 weight per cent and so that the most soluble components are segregated at the end of the enriching section in the extract phase and the least soluble components are segregated at the end of the stripping section as a raffinate phase, further separating at least part of one of the phases at such an intermediate point in the extraction path that the separated phase contains only diolefins and components of greater solubility than the diolefins, and further extracting said separated phase to purify the diolefins.

26. A process for the segregation of diolefins of average molecular weight less than about 250 from a relatively narrow boiling hydrocarbon feed mixture containing components some of which are more soluble and some of which are less soluble in the solvent than the diolefins, which comprises introducing the feed mixture at an intermediate point in a countercurrent treating path comprising a stripping and an enriching zone, introducing a solvent consisting of ammonia and a modifying solvent soluble in liquid ammonia which reduces the solvent power of said ammonia into the end of the countercurrent treating path adjacent the point of final raffinate phase withdrawal, countercurrently contacting the feed mixture and controlling by addition of modifying solvent the solvent power of the ammonia solvent so that the concentration of hydrocarbon dissolved in the solvent is between the limits of 5 to 30 weight per cent and so that the most soluble components are segregated at the end of the enriching section in the extract phase and the least soluble components are segregated at the end of the stripping section as a raffinate phase, further separating at least part of one of the phases at such an intermediate point in the extraction path that the separated phase contains only diolefins and components of lesser solubility than the diolefins, and further extracting said separated phase to purify the diolefins.

GEORGE H. CUMMINGS.
WILLIAM J. SWEENEY.
MERRELL R. FENSKE.